(12) United States Patent
Creti et al.

(10) Patent No.: US 11,221,829 B2
(45) Date of Patent: Jan. 11, 2022

(54) METHOD FOR MANUFACTURING A SECURE, MODULAR BUSINESS-SPECIFIC HARDWARE APPLICATION AND CORRESPONDING OPERATING SYSTEM

(71) Applicant: BULL SAS, Les Clayes-sous-Bois (FR)

(72) Inventors: Luc Creti, Bezons (FR); Albert Ngo, Bezons (FR); Dominique Tronche, Bezons (FR)

(73) Assignee: BULL SAS, Les Clayes-sous-Bois (FR)

( * ) Notice: Subject to any disclaimer, the term of this patent is extended or adjusted under 35 U.S.C. 154(b) by 33 days.

(21) Appl. No.: 16/727,312

(22) Filed: Dec. 26, 2019

(65) Prior Publication Data

US 2020/0210150 A1    Jul. 2, 2020

(30) Foreign Application Priority Data

Dec. 27, 2018    (FR) ...................... 1874267

(51) Int. Cl.
*G06F 8/30* (2018.01)
*G06F 9/4401* (2018.01)

(52) U.S. Cl.
CPC .............. *G06F 8/30* (2013.01); *G06F 9/4406* (2013.01)

(58) Field of Classification Search
CPC ................................ G06F 8/30; G06F 9/4406
See application file for complete search history.

(56) References Cited

U.S. PATENT DOCUMENTS

| | | | |
|---|---|---|---|
| 9,692,666 B2 * | 6/2017 | Salokanto | H04L 41/0896 |
| 9,800,517 B1 * | 10/2017 | Anderson | H04L 47/70 |
| 9,804,952 B1 * | 10/2017 | Cohen | G06F 11/3644 |
| 9,916,233 B1 * | 3/2018 | Qureshi | G06F 8/70 |
| 10,824,726 B1 * | 11/2020 | Saffar | G06F 21/566 |
| 2006/0242409 A1 * | 10/2006 | Reneris | H04L 9/0841 |
| | | | 713/168 |
| 2015/0142878 A1 * | 5/2015 | Hebert | H04L 67/10 |
| | | | 709/203 |

(Continued)

FOREIGN PATENT DOCUMENTS

WO    WO2017192415 A1    11/2017

OTHER PUBLICATIONS

Joe Grand, "Practical Secure Hardware Design for Embedded System" (Year: 2004).*

(Continued)

*Primary Examiner* — Phillip H Nguyen
(74) *Attorney, Agent, or Firm* — Meagher Emanuel Laks Goldberg & Liao, LLP (57) ABSTRACT

Disclosed is a method for manufacturing a secure, modular business-specific hardware application, including: a step of selecting: a hardware computer integrated into a closed case that isolates it from the outside so as to make the hardware resources of this hardware computer structurally non-expandable because these resources cannot be accessed from outside the case without damaging them, an operating system for managing containers in a generic, lightweight fashion, associated with the computer, a software development kit, associated with the operating system and with the computer, container templates, business-specific software components, a step of deploying the business-specific software components in instantiated containers based on the container templates.

20 Claims, 1 Drawing Sheet

(56) References Cited

U.S. PATENT DOCUMENTS

| | | | |
|---|---|---|---|
| 2016/0219073 A1 | 7/2016 | Mathur et al. | |
| 2017/0322824 A1* | 11/2017 | Reuther | G06F 3/0632 |
| 2018/0198824 A1* | 7/2018 | Pulapaka | G06F 9/455 |
| 2018/0247064 A1 | 8/2018 | Aronovich et al. | |
| 2018/0331905 A1* | 11/2018 | Toledo | H04L 43/0882 |
| 2018/0357068 A1* | 12/2018 | Ambichl | G06F 9/44521 |
| 2019/0087220 A1* | 3/2019 | Turner | G06F 9/455 |
| 2019/0347127 A1* | 11/2019 | Coady | G06F 11/3442 |

OTHER PUBLICATIONS

Correspondence from the French National Institute of Industrial Property Office (INPI—Institute National De La Propriété Industrielle) for FR1874267 dated Nov. 4, 2019; Preliminary Research Report of the French National Institute of Industrial Property Office for FR1874267 dated Oct. 30, 2019; and Written Opinion on the Patentability of the Invention issued by the French National Institute of Industrial Property Office for FR1874267.

* cited by examiner

METHOD FOR MANUFACTURING A SECURE, MODULAR BUSINESS-SPECIFIC HARDWARE APPLICATION AND CORRESPONDING OPERATING SYSTEM

CROSS-REFERENCE TO RELATED APPLICATIONS

This application claims the benefit of French Patent Application No. 1874267 filed Dec. 27, 2018, the disclosure of which is herein incorporated by reference in its entirety.

FIELD OF THE INVENTION

The invention relates to the field of methods for manufacturing a secure, modular business-specific hardware application, as well as to the field of operating systems which are able to manage containers in a generic, lightweight fashion and which are intended to be used in a method for manufacturing a secure, modular business-specific hardware application.

TECHNOLOGICAL BACKGROUND OF THE INVENTION

A hardware application, is a physical device intended to provide one or more dedicated computing services autonomously.

A hardware application typically comprises within its scope the following features: a computer (hardware), an operating system, and a package of "business" software, meaning that the software is specific to the computing services of the specific business application contemplated.

The hardware configuration of the computer that is part of the hardware application depends on the resources needed to implement the business tasks. These generally include the following features: one or more microprocessors, "volatile" RAM memory, persistent storage memory (magnetic hard drive or SSD), one or more network interfaces.

This computer may generally contain hardware components developed specifically by its manufacturer to take part in carrying out business tasks. Adding such components offers an important way to distinguish the product from a solution based on standard components available on the market.

Unlike open operating systems, a hardware application is intended for executing a dedicated task (or set of related tasks). It is therefore designed to not be alterable through the addition of further software or hardware that would make it possible to carry out additional tasks, and as such is not expandable.

One useful benefit of hardware applications in "open" computer systems is their ability to facilitate the deployment of computer services. This is because they offer their business services in the form of "plug-and-play" solutions that are easy to integrate into a complete computer system.

Due to its "monolithic" design, providing a service in the form of a hardware application spares its user the following constraints that arise when the service is offered in an open system: the choice and design of the hardware intended to host the service; the choice, installation, and configuration of the operating system on the chosen hardware; the installation of the software that provides the business services; the solving of compatibility problems that occur at each level; the securing of the whole (hardware and software protection). Time and ease of deployment are therefore greatly improved by providing a computer service in the form of a hardware application.

The level of computing expertise required from the user by these solutions is also lower, because the hardware application removes this complexity, offloading it entirely onto the manufacturer of the device.

The development of the hardware portion of a hardware application is a complex, expensive activity that requires skills in various fields of hardware design as varied as designing circuit boards or designing cases. Not every software developer that wishes to offer solutions in the form of a hardware application necessarily has the skills and resources needed to develop this hardware portion. In such a situation, the developer enlists an OEM supplier that offers hardware that meets the needs of its solution.

When the provided hardware contains peripherals proprietary to the manufacturer, the software components required to interact with these peripherals are not integrated into common operating systems, nor even available for download on the Internet as is the case for standard peripherals. In such a situation, the hardware manufacturer delivers software (system drivers and libraries) with the hardware in order to allow appliance developers to interact with these proprietary peripherals. These software components are combined into what is known as a software development kit (SDK).

In the world of computer application development, microservices architectures are a style of software architecture in which a complex set of applications is broken down into multiple processes (microservices) which are independent and easily coupled, often specializing in a single task. This architecture is unlike the monolithic architecture wherein the same computer services are provided by a single complex process that is in charge of the entire service.

The advantages of microservices architectures relative to monolithic architectures are: improving the maintainability of the application; the reusability of certain services; improving the overall resilience of the system; improving the adaptability of the application to changing needs. One rule in the design of microservices is the separation of responsibilities in the services that make up the application. Each service is designed to carry out one and only one task with the best quality of service possible.

From the foregoing, it is clear that hardware application solutions offload a large share of the complexity of implementation from the user of the solution onto the manufacturer of the hardware application, and that this is a major part of their added value. More particularly, with respect to the operating system of the hardware application, the following tasks must be carried out: choosing the operating system; choosing the system components to install; potentially constructing the system; setting the default configuration of the system; optimizing performance; securing (hardening); designing and carrying out installation procedures; designing and carrying out update procedures; and doing it all on an industrial scale. Carrying out these tasks requires a significant investment of time and equipment.

Additionally, this activity requires a high level of expertise in areas of skill that often have no direct relationship with those needed to produce the "business" software that is to be installed within the hardware application. This means that when a player who specializes in a very specific field of activity and is an expert in their field wishes to produce a hardware application in order to deliver their expertise in this format, they do not necessarily have the experts and physical infrastructure required to produce the operating system of their hardware application.

Furthermore, when the hardware is provided in OEM mode, this risky, critical, and expensive task must be performed by each hardware application manufacturer based on a given OEM hardware. It may therefore be beneficial for the OEM hardware supplier to deliver, in addition to the usual SDK, an operating system (or base) adapted to the hardware that it is providing.

The present invention will more particularly apply to operating systems that support container technologies, including but not limited to Linux and FreeBSD.

For the OEM supplier, this approach would make it easier for its customers to adopt its solution when unable to develop the operating system on their own due to lacking the resources required. For customers, this approach would ensure the availability of a state-of-the-art operating system in terms of features, robustness, and security, whose compatibility with the provided hardware would be guaranteed by the OEM supplier, without requiring complex developments.

The costs associated with producing this base would therefore be pooled between the various customers of the OEM supplier, instead of being replicated with each customer, enabling the completion of a quality product at reasonable costs despite the high level of expertise required to produce it. The profits from the savings achieved in this way would be distributable between the customer and OEM supplier on terms dictated by market forces.

Supplying a base associated with hardware provided in OEM mode, however, is not a common practice. One major tactical obstacle that makes the provision of a base by an OEM supplier difficult is the fact that, in a conventional architecture, the technical choices carried out during all the steps of manufacturing the base have an impact on its ability to accommodate business applications, and that these technical choices are difficult to modify after the base has been produced.

In particular, when designing the base, in order to achieve a good level of security, it is necessary to ensure that the base includes only the strictly required minimum of software components. In an even more advanced approach, it is possible to plan to modify these components themselves in order to eliminate or disable certain unnecessary functions of these components. The purpose of this "lightweight" approach is to reduce the attack surface of the base, meaning the number of entry points that a threat actor could exploit in order to conduct malicious actions.

Although it is technically possible to construct a base from an existing operating system distribution, by eliminating unnecessary components, this top-down approach should be avoided when aiming for a quality result, because it would then be much more difficult, due to the interwoven dependencies of the various components, to eliminate all of the needless components. The best approach consists of applying a bottom-up method that starts with a system made up of a single kernel, to which the software components needed for the system to operate are added one by one.

In order to summarize the problem, it is critical to keep in mind that, in our base built using a bottom-up approach, adding more software components requires having a technical and human environment, i.e. computers, software, and experts for producing the base. This approach goes against the goal of reducing complexity for hardware application developers. The result is that all of the software components needed for the hardware application to operate and for the business software to be accommodated must have been included at the time the base was produced, and as such the base is fixed in its functional content from the time it was manufactured.

However, accommodating business components may require adding components to the base in order to ensure that they work as they should. Therefore, the goal is to offer a base suitable for using the hardware by the producer of the OEM solution without anticipating either the business applications that will be executed on the hardware application or the technologies on which they will be based.

If these applications are based on a compiled language, then it will be necessary to provide, in addition to the base, all of the tools needed to compile programs capable of running on the base. If these applications are based on interpreted languages, they will need the environment related to the technology they use. Such technologies are numerous: Java, Python, Ruby, Perl, PHP, NodeJS, for instance.

Subsequent elimination of excess software components added to a base built using a bottom-up approach is, however, likely to cause certain problems common with the top-down approach. In fact, all of these factors lead to a sort of dilemma:
  either the base is meant to be very versatile, in which case
    a large number of software components must be added,
    thereby increasing its attack surface and potentially
    making it more vulnerable,
  or the base is built with few components, and therefore
    with a low attack surface, but the business applications
    that it can accommodate are restricted, thereby reducing its versatility and thus its attractiveness to potential
    customers.

Another problem posed by a highly versatile base is the storage space that it will occupy, which will grow as more software components are added. This is because the persistent storage space available in a hardware application may be fairly limited, and the size of its volatile memory even more so.

And yet, the operating system, in a hardware application, will often be deployed in the form of a memory-based file system, as is often the case in the world of embedded software. Limiting the memory space used is therefore an important feature as a hardware application is a closed system in which there is no possibility of adding further storage space, persistent or otherwise. Furthermore, these two types of memory occupancy take away from the space available for business applications, greatly reducing the benefit of the solution if the available space becomes too restricted.

Thus a base should be provided with as few software components as possible (for the reasons mentioned above), yet still capable of accommodating a wide variety of business applications created with various technologies that are not known in advance, in order to suit as many users as possible. In order to further improve the attractiveness of this solution, the deployment of business applications on this base must be easy to implement in order to offer short development times for the production of hardware applications based on this solution.

Some prior art documents have attempted to propose partial solutions to the various problems mentioned above.

Designing an operating system via the top-down approach may solve the stated problem, but outside the conceptual security problems inherent in this approach as already mentioned above, this technique does not allow the business services to be isolated from one another, nor from the operating system, which from a security standpoint is not optimal.

Another solution may be to use a hardened lightweight operating system containing a hypervisor that makes it possible to deploy standardized virtual machines. The business software components may then be deployed in virtual machines. This approach would make it possible to achieve: a generic solution, because the operating system would be agnostic with respect to the virtual machine that it hosts; an environment for executing the business services independently from the underlying operating system; an environment for executing business services independently from one another.

From the standpoint of system security, this is probably a good conceivable solution from the standpoint of maximizing security, because a state-of-the-art virtualization system provides a high-quality level of isolation both between the virtual machines and the operating system and between the virtual machines themselves.

From the standpoint of making the solution generic, it is probably again a good conceivable solution from the standpoint of maximizing genericity, because virtualization technology makes it possible to run different types of operating systems (Linux, Windows, FreeBSD) on the same hardware simultaneously.

The use of virtualization technology therefore enables simultaneous management of highly varied execution environments.

However, this solution suffers from major drawbacks, particularly when implemented in the context of a hardware application. These drawbacks particularly include:
- a long boot time for the virtual machines. Booting a virtual machine is the equivalent of booting a physical machine, with all phases of the boot process needing to be carried out. This boot time substantially delays the time needed to make the business services available when the hardware application is rebooted,
- sizable resource consumption. Because virtual machines require the execution of a complete operating system, the consumption of resources in terms of memory use and computing power is greater than when the applications are executed directly within the underlying operating system. This matter is particularly delicate in the case of hardware applications, because as they are closed systems, there is no way to add memory or processor power,
- for the same reasons as mentioned above, the consumption of drive space by the virtual machine-based solution is also increased in considerable proportions,
- packaging business applications in the form of virtual machines is a time-consuming operation that requires complex integration processes.
- although it has substantially improved, support for USB peripherals through virtualization solutions still remains a problem that may cause issues if the business applications need to access USB peripherals of the hardware application.
- finally, virtualization solutions have trouble supporting non-"standard" expansion peripherals such as PCI Express cards or other dedicated hardware. Generally speaking, such peripherals cannot be used by virtual machines. However, in the case of a hardware application, it is not rare to need to manage this type of hardware device.

Consequently, although the hypervisor-based solution makes it possible to address certain aspects of the stated problem in a fairly satisfactory manner, particularly the aspects of security and modularity, significant drawbacks persist for use in the field of hardware applications, making this solution relatively impractical to implement. Additionally, such a solution could ultimately be unattractive for potential customers, due to the sizable remaining complexity of the task of adapting the business applications.

SUBJECT MATTER OF THE INVENTION

The purpose of the present invention is to provide a method for manufacturing a secure, modular business-specific hardware application that at least partially remedies the aforementioned drawbacks.

By definition, a business hardware application is specific and dedicated to a particular computer service. A fairly contradictory dual problem of security and genericity, which approaches a real dilemma, must then be resolved. This is because, if the solution proposed to manufacture this business-specific hardware application is not secure enough, its vulnerability will prevent all potential clients from finding it attractive, whereas if it is not generic enough, its excessive specificity will prevent most potential clients from finding it attractive. Thus, two seemingly opposite families of strategies exist to manufacture this business-specific hardware application:
- the fully dedicated strategy, with a limited number of software components focused exclusively on the present need, which offers good security but insufficient genericity, because the attack surface is small but the service platform is fixed,
- the versatile strategy, with a limited number of software components to anticipate numerous potential developments, which offers good genericity but insufficient security, because the attack surface is large but the service platform remains upgradeable.

The invention proposes to improve this compromise using a fairly versatile strategy to ensure genericity, but while also ensuring security by implementing this versatile strategy at an intrinsically more secure level than the level of the virtual machines that could be spontaneously conceived, namely the level of the containers which intrinsically offers a slightly lesser degree of separation between business software components which is still satisfactory while requiring much fewer hardware and software resources, and much less time to implement these hardware and software resources.

This slight sacrifice in terms of security is:
- partially counterbalanced by the savings in terms of hardware and software resources and by the savings in terms of time required to launch and implement these hardware and software resources,
- and partially offset by the use of a non-expandable closed system isolated from the outside, said closed system, despite its size often being smaller than a typical server, being able to properly support the deployment of containers, particularly due to the streamlining of its operating system.

To achieve this, the invention, in addition to the hardware computer and software development kit, also offers the manufacturer of a business-specific hardware application based on business software components an operating system that can manage containers in a generic, lightweight fashion, as well as container templates that make it possible to instantiate business software components within these containers.

Preferentially, this operating system is reduced to a minimal kernel of essential functions that securely manages the containers while maintaining their genericity.

This approach is the happy medium and proper compromise between providing no operating system at all to the business-specific hardware application manufacturer, which is what happens in most cases, thereby requiring the manufacturer to invest a lot of skill and energy in creating one, and providing a plug-and-play system that is easier to use at the cost of high specificity, substantially inhibiting or reducing the upgradability of the business-specific hardware application produced in this way.

The invention therefore proposes both adding an operating system which remains generic (for genericity) and lightweight (for security), and distributing business software components at a container virtualization level rather than at a virtual machine virtualization level, this container level having the dual benefit of intrinsic partitioning that is still satisfactory though slightly weaker, retaining a good level of security and a reduced need for hardware and software resources in order to operate, as well as substantially greater flexibility and speed, with integration into a closed case completely isolating it from the outside (the case cannot be physically opened without damaging the operation of the business-specific hardware application) at least partially offsetting the slight sacrifice in terms of security, which is furthermore greatly offset by the drastic reduction of the resources and time taken to launch and implement these resources.

To this end, the present invention proposes a method for manufacturing a secure, modular business-specific hardware application, comprising: a step of selecting: a hardware computer integrated into a closed case that isolates it from the outside so as to make the hardware resources of this hardware computer structurally non-expandable because these resources cannot be accessed from outside the case without damaging them, an operating system for managing containers in a generic, lightweight fashion, associated with the computer, a software development kit, associated with the operating system and with the computer, container templates, business-specific software components, a step of deploying the business-specific software components in instantiated containers based on the container templates.

To this end, the present invention also proposes an operating system capable of managing containers in a generic, lightweight fashion, intended to be used in a method for manufacturing a secure, modular business-specific hardware application, characterized in that it comprises: a generic mechanism for managing a non-predetermined number of containers, comprising: a function of installing container templates, a function of updating the container templates, a function of creating a container by instantiating a container template, a function of starting a container, a function of stopping a container, a function of destroying a container, a mechanism for configuring said generic mechanism for managing containers, capable of configuring: the list of containers to be managed, the set of additional components required for the operation of the containers to be managed.

An important feature according to the embodiments of the described invention consists, for a supplier of hardware intended for the manufacture of a hardware application, of providing, in addition to its hardware, an operating system comprising the following features:

the strict minimum in terms of software components needed to install, initialize, update, and run an operating system and a container management system, a generic mechanism making it possible to manage, for an arbitrary number of containers not known in advance:
the installation and updating of the container templates,
the creation of a container,
the starting of a container,
the stopping of a container,
the destruction of a container,
a mechanism for configuring the management mechanism described above, said configuration making it possible, for a given hardware application, to configure:
the list of containers that must be managed,
the set of additional features related to these containers (networks, data volumes, etc.),
a "hardened" configuration of all the software that forms part of the system,
optionally, software components intended to strengthen the system's security,
if applicable, all additional non-standard software needed to use the specific hardware included in the hardware application,
optionally, one or more example or management container templates intended to facilitate the use of the specific hardware of the hardware application or the writing of future container templates using this hardware.

In preferred embodiments, the invention comprises one or more of the following features which may be used separately or in partial combination with one another or in full combination with one another, with one or more of the aforementioned subjects of the invention.

Preferably, the operating system capable of managing containers in a generic, lightweight fashion comprises: a generic mechanism for managing a non-predetermined number of containers, comprising: a function of installing container templates, a function of updating the container templates, a function of creating a container by instantiating a container template, a function of starting a container, a function of stopping a container, a function of destroying a container, a mechanism for configuring said generic mechanism for managing containers, capable of configuring: the list of containers to be managed, the set of additional components required for the operation of the containers to be managed.

Preferably, said generic mechanism for managing containers comprises only: said function of installing container templates, said function of updating the container templates, said function of creating a container by instantiating a container template, said function of starting a container, said function of stopping a container, said function of destroying a container.

Preferably, said configuration mechanism of said generic mechanism for managing containers is able to configure only: said list of containers to be managed, said set of additional components required for the operation of the containers to be managed.

Preferably, said set of additional components required for the operation of the containers to be managed, comprises: virtual networks, and/or data volumes, and/or access to business-specific hardware components with the access rights of the various containers to said components.

Preferably, the number of software components forming said operating system is less than 100 software components, and preferably between 50 and 100 software components.

Thus, the operating system achieves an optimal compromise between genericity on the one hand and security (decreasing the attack surface by reducing the number of software components) on the other.

By way of comparison, a conventional system of the prior art comprises around 900 software components, while a system that is already considered streamlined and optimized because it is mostly focused on essential functions still comprises around 250 software components.

Preferably, said hardware computer, integrated into a closed case that isolates it from the outside so as to make the hardware resources of this hardware computer structurally non-expandable because these resources cannot be accessed from outside the case without damaging them, already includes the potential business-specific hardware component(s).

Thus, the security of the proposed manufacturing method is further improved.

Preferably, the business-specific hardware component or one of them is a cryptographic card that is advantageously capable of creating/authenticating electronic signatures and/or of performing data encryption/decryption.

Thus, the security of the proposed manufacturing method is further improved.

Preferably, said hardware computer comprises at least: one or more microprocessors, one or more volatile memories, one or more persistent memories, one or more network interfaces.

Preferably, the total capacity of the volatile memory(-ies) is between 5 and 30 GB, preferably between 10 and 20 GB, and the total capacity of the persistent memory(-ies) is between 50 and 500 GB, preferably between 100 and 300 GB.

Preferably, said deployment of business-specific software components is organized into a microservices architecture.

Thus, the genericity of the proposed manufacturing method is further improved.

Preferably, additional security software components are implemented within said operating system, and/or specific configurations increasing the level of security are implemented within said operating system.

Thus, the security of the proposed manufacturing method is further improved.

Preferably, dedicated business hardware is implemented within the business-specific hardware application, and additional software components for controlling the dedicated business hardware are implemented within said operating system.

Thus, additional specific features may be added without substantially reducing genericity.

Preferably, the configuration of the entire software portion of the business-specific hardware application is hardened to improve its security, and/or the configuration of the operating system is hardened to improve its security.

Thus, the security of the proposed manufacturing method is further improved.

Preferably, the operating system is a Linux operating system, the container management system is the Docker system.

Thus, this operating system and this type of container offer an optimized compromise between security and genericity.

Other characteristics and benefits of the invention will become apparent upon reading the following description of a preferred embodiment of the invention, given as an example with reference to the attached drawings.

DETAILED DESCRIPTION OF THE INVENTION

Figure 1:
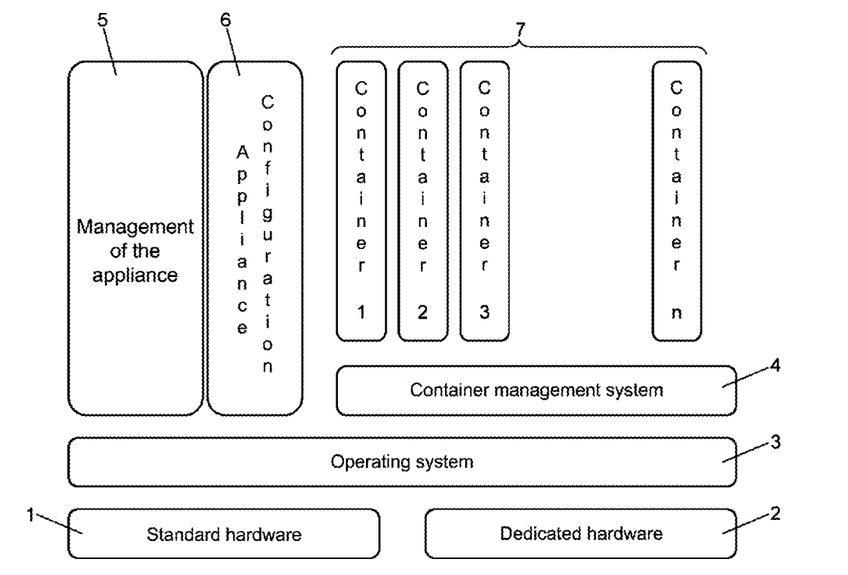
FIG. 1 schematically depicts an example of a computer system as a block diagram for implementing the method for manufacturing a secure, modular business-specific hardware application according to one embodiment of the invention.

FIG. 1 schematically depicts an example of a computer system as a block diagram for implementing the method for manufacturing a secure, modular business-specific hardware application according to one embodiment of the invention.

The method for manufacturing a secure, modular business-specific hardware application comprises first a step of selection and then a step of deployment.

In the step of selection, multiple features are selected from among the following features. First, there is a hardware computer, integrated into a closed case that isolates it from the outside so as to make the hardware resources of this hardware computer structurally non-expandable because these resources cannot be accessed from outside the case without damaging to them, these hardware resources comprising standard hardware 1 and business-specific hardware 2. Next, there is an operating system 3 that is capable of managing containers 7 in a generic, lightweight fashion, associated with the hardware computer 1 and 2, this operating system 3 including a generic mechanism 4 for managing a non-predetermined number of containers, as well as a mechanism for configuring said generic mechanism for managing containers. After that, there is a system for managing 5 the business-specific hardware application, a system for configuring 6 the business-specific hardware application, and a software development kit associated with the operating system 3 and with the computer 1 and 2 (not shown in FIG. 1), container templates 7, and business-specific software components capable of controlling the dedicated hardware 2.

In the step of deployment, the business-specific software components are deployed in containers 7 instantiated based on the container templates 7.

Before explaining the advantages of the solution and how it is suitable for solving the stated problem, a brief introduction to containerization techniques will first be made.

A containerization system is comparable to a highly streamlined virtualization system.

In the case of a virtualization system, only the hardware resources, including the volatile memory, the processor, and the permanent storage system, are shared, while all of the other layers are completely duplicated between each virtual machine.

In the case of a container management system, the sharing includes the kernel of the machine's operating system, the isolation between the different containers being carried out by the underlying kernel through a rights system based on naming spaces.

The management of the sharing of physical resources is therefore much more optimized in container management systems, because it is carried out by a single kernel, whereas, in the case of virtual machines, there are as many kernels as there are virtual machines.

The containers may thereby be streamlined relative to virtual machines, because the number of components needed to operate them is greatly reduced.

In order to give a sense of the quantity of software implemented in both technologies, a basic container will be about 5 MB, whereas a virtual machine of equivalent capacity will be about 200 MB.

Containerization systems can also offer features to separate persistent data, thereby improving the resilience of the system as a whole by forcing the developer of the application to separate the storage of the application's code from the storage of user data.

When this function is available, if a container is destroyed and then recreated, all of the container data is erased, and a "new" container identical to its reference image is created. In this model, to ensure the persistence of user data, "data volumes" must be created, and the settings should indicate to the container management system that the user data will be stored in these data volumes.

Container management systems also offer the option of managing "virtual" networks that allow containers to communicate with one another, these networks being, unless configured otherwise, confined to the machine that hosts the operating system, and therefore inaccessible from the physical network interfaces of the machine.

This isolation of the virtual networks makes it possible to ensure secure communications between the various containers of the system.

Each container may approximately be compared to a set of processes grouped within the same naming space, running under the control of the underlying operating system. These are "active" features that carry out actual processing.

The containers are created (or instantiated) based on "templates" or images that contain all of the programs and data files needed to execute the containers. The images are static, passive elements that carry out no actual processing.

It is possible to execute multiple containers from the same image.

The images are installed in the container management systems, either by being downloaded from an appropriate server that is part of the containerization system, or by an mechanism to importing/exporting archive files containing the images.

The solution proposed by embodiments of the invention is structurally similar to the virtual machine-based solution mentioned previously, but the use of containers in place of virtual machines offers advantages that make its application well-suited to solving the problem posed by hardware application systems.

The underlying operating system is lightweight, because it contains only what is strictly needed to ensure its own operation, that of the dedicated hardware, and that of the container management system. The objective of a smaller attack surface is therefore achieved.

The proposed system is generic and may serve to allow numerous types of hardware applications with the same hardware, because no assumption is made about the number or function of the containers to be deployed.

In the block diagram of the system presented in FIG. 1, to define a new hardware application, only the containers and configuration file of the hardware application manager depend on the business tasks and will be produced by the hardware application developer. All of the other components can be reused without modification.

The system is capable of accommodating any container compatible with the operating system and its corresponding container management system.

The entire business portion of the various hardware applications is therefore offloaded into the containers and consequently has no impact on the underlying system.

Each container may, independently of the others, host different interpreters or execute compiled binaries compatible with its execution capabilities. The only limitation on the genericity of the solution is that the kernel of the underlying system must be capable of executing all of the system calls made by all of the containers.

The genericity and reusability objective of the solution is therefore also achieved.

The time it takes to start a container is greatly reduced, particularly due to the fact that it does not contain a complete operating system and to the fact that it uses highly efficient file system management systems. The objective of having a system with low impact on hardware application boot time is therefore also achieved.

Container technologies rely on the abilities of modern kernels to isolate access to resources. In this way, a given container does not by default have access to the resources manipulated by the other containers, nor to those manipulated by the operating system hosting them. Thus, the exploitation of a security flaw present in one of the containers does not affect the other containers, and thus because the appliance is correctly divided, the scope of the attack is limited.

If resources must be shared, the configuration will indicate this explicitly. It is therefore possible, through configuration, to control the sharing of the resources between the operating system and containers. It is therefore observed that the objective of partitioning is achieved through the use of this technique.

Container management systems, because the containers all use a single kernel on a given machine, provide greater efficiency in the management of memory and microprocessor (CPU, "Central Processing Unit") computing power resources.

Additionally, the container template system and the ability to hierarchically organize these containers enables highly efficient management of the hard drive space consumed by reusing various templates.

In order to optimally benefit from this advantage, it is interesting to pay close attention to the hierarchical breakdown of the templates. It should be noted that the invention itself has no control over this breakdown, and that these precautions will be taken by the developers of the containers that are to be deployed on the solution proposed by the invention.

All of these features regarding the optimization of the use of hardware resources make the solution proposed by the invention a particularly well-suited solution for the use of hardware applications due to the limitation and non-expandability of these hardware resources in the context of closed systems.

As already seen earlier, container management systems share the use of a single kernel among various containers instead of enlisting a virtualization system. As a result of this situation, if the kernel can interact with hardware specially developed for the hardware application, it is also possible to give this hardware access to the various containers. This solves the problem of access to PCI Express peripherals, which could not be used when virtual machines were employed, and to USB peripherals which are still problematic when used via a hypervisor.

In summary, with the solution proposed by the invention, it therefore becomes possible to benefit from a capability to isolate and partition while solving the issues of boot time, optimization of resource use, and access to PCI Express expansion cards, all in a generic enough manner that this development effort can be shared among numerous customers.

This invention may lead to future developments such as the addition of a further security level by signing the container templates, or by adding generic administration solutions for hardware applications.

One example of an implementation of the method for manufacturing a secure, modular business-specific hardware application according to the embodiments of the invention will now be described.

This implementation of the principles of the solution proposed by the invention was applied to the OEM version of the "Trustway Proteccio" hardware.

The following is brief overview of the hardware platform on which this embodiment was made.

A cryptographic hardware application, the "Trustway" HSM provides an open hardware platform offering highly secure cryptographic functions.

It allows developers to embed a complete software environment (system and applications).

Besides the security of the cryptographic operations that it provides, the "Trustway Proteccio" OEM solution allows the design of complete hardware security appliances based on a hardware platform provided by the company Atos as a "white label" that can be customized with the graphical identity of the developer.

Besides physical security devices at the cutting edge of technology, the code signature and verification mechanisms offer hardware applications an unparalleled level of security.

A proprietary distribution based on the Linux operating system was created for the hardware platform described above, in order to deploy containers offering application services that could use the cryptographic hardware present in the hardware application.

The proposed distribution allows the deployment of containers whose main constraint is that they must be compatible with the version and configuration of the kernel of the proposed distribution's operating system.

This distribution is based on the Linux operating system and is built using a construction tool called "buildroot", a tool designed to produce Linux distributions for embedded software.

The container management system chosen for this embodiment is the "Docker" system.

To evaluate the attack surface of the solution achieved, the following features may be observed. The system is made up of 70 software components, three of which are specific to the operation of the "TrustWay Proteccio" solution. The system takes up around 200 MB of hard drive space.

The detailed list of all the software components that form this operating system will be described in a file.

It should be noted that the list of these components does not include Java, Perl, or Python interpreters, or other similar tools in our barebones distribution. However, it is capable of hosting containers that use these technologies.

The hard drive footprint of the various software components of the base is depicted in graphical form in a file.

It should be noted that a large share of the hard drive footprint of the solution is due to the choice of "Docker" technology.

A dependency chart of the various components will be produced and described in a file.

The configuration of the operating system was hardened by our experts in accordance with the relevant prior art.

The use of "Docker" makes it possible to structurally benefit from partitioning linked with this technology.

This is because the "Docker" security model minimizes the ability of each container to interact with the privileged features of the underlying operating system.

For instance, in order for a given container to be able to edit the date of the underlying operating system, this privilege must be explicitly granted to the container by the configuration.

The containers hosted on a given machine are also isolated from one another.

Typically, two containers that want to communicate with one another must do so by means of a virtual network interface (to be configured explicitly) and a client-server communication architecture. The files and processes of a container are invisible to all the other containers.

The use of this technology therefore makes it possible to effectively benefit from partitioning of the various business services from one another, meaning that if a given service is compromised by a threat actor, it will not necessarily compromise the security of the entire system.

In order to be able to use the cryptographic hardware included in the "Proteccio" OEM platform, software components that are part of the standard "Proteccio" OEM solution were added to a proprietary distribution.

Those components make it possible to give access to the cryptographic hardware from the operating system by means of an additional kernel module (the driver) interfaced by means of a Linux device.

By default, due to the "Docker" security model, this device cannot be accessed from within the "Docker" containers. However, a discretionary option makes it possible to authorize a given container to access this device.

It should be noted that with this model, a container seeking to access the physical cryptographic module does not need to have the driver (because the driver is present and shared in the underlying operating system), but rather only to know how to interact with the Linux device, which reduces the number of specific software components to be included in the container.

It should also be noted that due to partitioning, not all of the containers of the hardware application can necessarily access the physical cryptographic module (because this is a highly sensitive component from a security viewpoint), but rather this access is decided on a case-by-case basis for each container depending on its actual needs.

A life cycle management system for "Docker" containers was developed and included in this base.

This system is based on a configuration file that makes it possible to describe which containers, virtual networks, and data volumes must be created in order to run the hardware application.

This file also makes it possible to describe the various options for configuring each of these operations.

When booting the hardware application, this "Docker" container management system automatically triggers and, in accordance with the configuration file, instantiates all of the virtual network containers and data volumes needed for the hardware application to operate.

When the machine is turned off, the opposite operations are performed by the manager, and the features mentioned above (except the data volumes) are destroyed.

Therefore, with each reboot, a hardware application is obtained whose executable code is an exact match of the contents of the container images delivered with the hardware application, as the user data is entirely confined within the data volumes.

This "reset" of all of the code of the hardware application increases the resiliency of the system in a very significant way, because with each reboot, only the user data can have changed since the previous reboot.

This system is generic, and makes no assumption as to the "Docker" containers or virtual networks used to run the hardware application.

The configuration file of the hardware application and all of the "Docker" container images to which reference is made define the entire behavior of the business portion of the hardware application.

With the solution proposed by the invention, a hardware application developer that wishes to use "Proteccio" OEM hardware (including the "TrustWay" proprietary cryptographic hardware) therefore only needs to produce the required "Docker" images and write the hardware application file, then install this file and the archives containing the images, at the locations specified within the distribution to have the hardware application operate per its specifications.

The user manual for this solution specifies the formats of each of these features, and where they must be installed, respectively, in order to create a hardware application based on this solution.

In order to expand the scope of the solution, it is possible to produce conceptually equivalent systems for each type of hardware application on which it is possible to execute a container management system.

Finally, it should be noted that the Linux/Docker combination is not the only possible solution for implementing this solution; rather, other container management systems exist for Linux. Furthermore, other operating systems besides Linux also offer container management solutions.

It is even possible to envision and develop a proprietary operating system and/or container management system that can achieve the same objectives.

Naturally, this invention is not limited to the examples and embodiments described and depicted, but rather is subject to numerous variations accessible to the person skilled in the art.

A glossary of technical terms is attached in the following table #1:

TABLE 1

| | |
|---|---|
| Hardware application Appliance Hardware application | A computing device specially designed to run software intended to provide a dedicated computer service autonomously. |
| Operating System Operating System O.S. | An operating system is a set of programs that direct the use of a computer's resources through software applications. |
| Software application | A software application is a program used directly to carry out a task. |
| Virtual machine | A virtual machine is a computer system that gives the illusion of a physical computer, thereby making it possible to run an operating system and software different from that of the physical machine hosting the system. Multiple virtual machines may run simultaneously on a single physical machine. |
| Hypervisor | A hypervisor is a virtualization platform that enables multiple operating systems to work on the same physical machine at once. |
| OEM | Original Equipment Manufacturer: a company that manufactures computer hardware components, primarily on behalf of another company. |
| SSD | Solid State Drive: computer hardware that enables the persistent storage of data on flash memory. Unlike magnetic hard drives, it contains no moving parts. |
| Microservices architecture | Style of software application architecture that is the opposite of monolithic architecture. |
| Attack surface | Sum of the various entry points through which an unauthorized user could potentially penetrate a computer system for malicious purposes. Minimizing the attack surface as much as possible is a useful security measure. |

TABLE 1-continued

| | |
|---|---|
| Business service | A function specific to a given area of activity carried out by computer software. |
| SDK | Software Development Kit: a software package intended to facilitate the development of applications for a given platform. |
| Driver system | A driver system is a computer program intended to enable another program (often an operating system) to interact with a peripheral device. Generally, each peripheral has its own driver. Put more simply, the driver of a given peripheral is a software program that explains to the operating system how to use this peripheral. This software is dedicated to the use of the peripheral that corresponds to it. |
| Linux system | In the Linux system, various special files are found in the /dev directory. Those files are called peripheral or device files, and they behave differently from ordinary files. They often make it possible to interact with the computer's hardware (such as the hard drive). These special files constitute the interface with the driver dedicated to a specific piece of hardware that is part of the Linux kernel, driver that in turn accesses the hardware. |
| Peripheral | A computer peripheral is a hardware device connected to a computer that adds features to that computer. The peripheral is not necessarily located outside the computer case, and might not even be physically visible. |
| Base | An operating system configured specially for a given purpose intended to be used multiple times in the same configuration. |
| Container | A container is a set of processes which are isolated from the rest of the operating system. It is executed from a distinct image that provides all the files needed to handle the processes that it contains. By providing an image that contains all the dependencies of an application, the container ensures the portability and consistency of the application across various environments. Existing container management systems include Docker, LXC, Solaris Containers, and FreeBSD jails. |
| Compiled language | In a compiled language, before it can be executed, the source code of a program must be translated into "binary" code using instructions supported by the microprocessor of the computer that will run it. The program in charge of this translation is called a "compiler". Once compiled, the program may be run an arbitrary number of times without needing to be translated again. The compiler's presence is therefore not necessarily required to run the program. |
| Interpreted language | In an interpreted language, the source code of the program is executed by software called an interpreter. The interpretation operation must be carried out as many times as the program is to be executed. The interpreter's presence is therefore required to run the program. |
| Memory-based file system | In a memory-based file system, the files are stored in the computer's volatile memory instead of being saved in a persistent storage area such as a magnetic hard drive or SSD flash memory. When the computer is rebooted, all of the files saved in a memory-based file system are lost. |
| Embedded software | Embedded software is software that makes it possible to run a machine, equipped with one or more microprocessors, in order to carry out a specific task with limited human intervention. Those microprocessors cover three main features: Processing related to the operation of the machine. Communication with another computer, or machine-to-machine. Communication with a person |
| Kernel | The kernel of an operating system is one of the main parts of the operating system. It manages the computer's resources and allows the various components, whether hardware or software, to communicate with one another. |

TABLE 1-continued

| | |
|---|---|
| Hardening | In computing, hardening is the process intended to make a system secure. The approach primarily consists of reducing the objects installed (software, software libraries, tools) to the essentials, and eliminating non-essential users and rights, while preserving the required functionalities. The underlying principle is that of reducing the possible attack surface, by assuming that any installed object is potentially a source of vulnerability. Reducing the number of objects installed therefore reduces the number of possible flaws for a given system. |
| USB peripheral | A hardware peripheral of a computer that can be connected by USB (Universal Serial Bus), a computer bus standard that can connect various types of devices, most frequently located outside the computer. |
| PCI-Express peripheral | A hardware peripheral of a computer that can be connected by PCI-Express, a standard that specifies a serial local bus (PCI Express bus) and a connector for linking expansion boards to a motherboard of a computer. |
| Container template | A container template, sometimes also called an image, is a set of files that can create multiple identical containers. The content of the model defines the features of the containers that will be created from this template. |
| HSM Hardware Security Module | A hardware security module is a device considered to be practically inviolable and that offers cryptographic functions. This is an electronic device that offers a security service consisting of generating, storing, and protecting cryptographic keys. |

The invention claimed is:

1. Method for manufacturing a secure, modular business-specific hardware application, comprising:
selecting a hardware computer integrated into a closed case that isolates the hardware computer from the outside so as to make hardware resources of the hardware computer structurally non-expandable because the hardware resources cannot be accessed from outside the case without damaging the hardware resources, an operating system for managing containers in a generic, lightweight fashion, associated with the computer, a software development kit, associated with the operating system and with the hardware computer, container templates, business-specific software components; and
deploying the business-specific software components in instantiated containers based on the container templates.

2. The method for manufacturing a secure, modular business-specific hardware application according to claim 1, wherein: the operating system capable of managing containers in a generic, lightweight fashion comprises: a generic mechanism for managing a non-predetermined number of containers, comprising: a function of installing container templates, a function of updating the container templates, a function of creating a container by instantiating a container template, a function of starting a container, a function of stopping a container, a function of destroying a container, a mechanism for configuring said generic mechanism for managing containers, capable of configuring: the list of containers to be managed, the set of additional components required for the operation of the containers to be managed.

3. The method for manufacturing a secure, modular business-specific hardware application according to claim 2, wherein: said generic mechanism for managing containers comprises only: said function of installing container templates, said function of updating the container templates, said function of creating a container by instantiating a container template, said function of starting a container, said function of stopping a container, said function of destroying a container.

4. The method for manufacturing a secure, modular business-specific hardware application according to claim 3, wherein: said configuration mechanism of said generic mechanism for managing containers is able to configure only: said list of containers to be managed, said set of additional components required for the operation of the containers to be managed.

5. The method for manufacturing a secure, modular business-specific hardware application according to claim 2, wherein: said set of additional components required for the operation of the containers to be managed, comprises: virtual networks, and/or data volumes, and/or access to business-specific hardware components with the access rights of the various containers to said components.

6. The method for manufacturing a secure, modular business-specific hardware application according to claim 1, wherein a number of software components forming said operating system is less than 100 software components.

7. The method for manufacturing a secure, modular business-specific hardware application according to claim 1, wherein said hardware computer, integrated into a closed case that isolates it from the outside so as to make the hardware resources of the hardware computer structurally non-expandable because these resources cannot be accessed from outside the case without damaging them, already includes one or more potential business-specific hardware components.

8. The method for manufacturing a secure, modular business-specific hardware application according to claim 7, wherein at least one of the one or more business-specific hardware components is a cryptographic card that is advantageously capable of creating/authenticating electronic signatures and/or of performing data encryption/decryption.

9. The method for manufacturing a secure, modular business-specific hardware application according to claim 1, wherein said hardware computer comprises at least: one or more microprocessors, one or more volatile memories, one or more persistent memories, one or more network interfaces.

10. The method for manufacturing a secure, modular business-specific hardware application according to claim 9, wherein the total capacity of the volatile memory(-ies) is between 5 and 30 GB, and the total capacity of the persistent memory(-ies) is between 50 and 500 GB.

11. The method for manufacturing a secure, modular business-specific hardware application according to claim 1, wherein: said deployment of business-specific software components is organized into a microservices architecture.

12. The method for manufacturing a secure, modular business-specific hardware application according to claim 1, wherein: additional security software components are implemented within said operating system, and/or specific configurations increasing the level of security are implemented within said operating system.

13. The method for manufacturing a secure, modular business-specific hardware application according to claim 1, wherein: dedicated business hardware is implemented within the business-specific hardware application, and additional software components for controlling the dedicated business hardware are implemented within said operating system.

14. The method for manufacturing a secure, modular business-specific hardware application according to claim 1, wherein the configuration of the entire software portion of the business-specific hardware application is hardened to improve its security, and/or the configuration of the operating system is hardened to improve its security.

15. The method for manufacturing a secure, modular business-specific hardware application according to claim 1, wherein: the operating system is a Linux operating system, a container management system is a Docker system.

16. A non-transitory computer readable storage medium containing instructions for an operating system capable of managing containers in a generic, lightweight fashion, intended to be used in a method for manufacturing a secure, modular business-specific hardware application, comprising: a generic mechanism for managing a non-predetermined number of containers, comprising: a function of installing container templates, a function of updating the container templates, a function of creating a container by instantiating a container template, a function of starting a container, a function of stopping a container, a function of destroying a container, a mechanism for configuring said generic mechanism for managing containers, capable of configuring: the list of containers to be managed, the set of additional components required for the operation of the containers to be managed.

17. The non-transitory computer readable storage medium according to claim 16, wherein: said generic mechanism for managing containers comprises only: said function of installing container templates, said function of updating the container templates, said function of creating a container by instantiating a container template, said function of starting a container, said function of stopping a container, said function of destroying a container.

18. The non-transitory computer readable storage medium according to claim 17, wherein: said configuration mechanism of said generic mechanism for managing containers is able to configure only: said list of containers to be managed, said additional components required for the operation of the containers to be managed.

19. The non-transitory computer readable storage medium according to claim 16, wherein: said set of additional components required for the operation of the containers to be managed, comprises: virtual networks, and/or data volumes, and/or access to business-specific hardware components with the access rights of the various containers to said components.

20. The non-transitory computer readable storage medium according to claim 16, wherein a number of software components forming said operating system is less than 100 software components.

* * * * *